July 23, 1940.  T. D. NATHAN  2,209,235
PIPE JOINT ASSEMBLY
Filed June 29, 1938  2 Sheets-Sheet 1
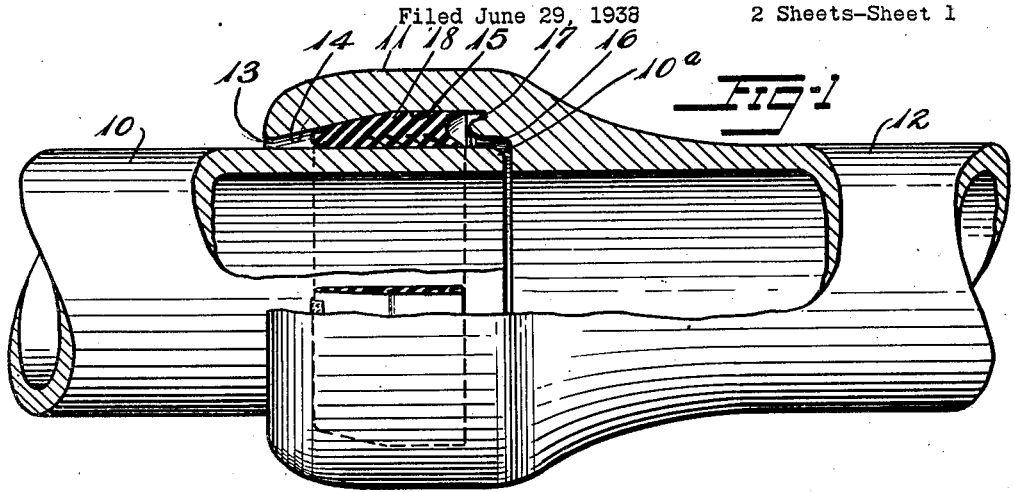
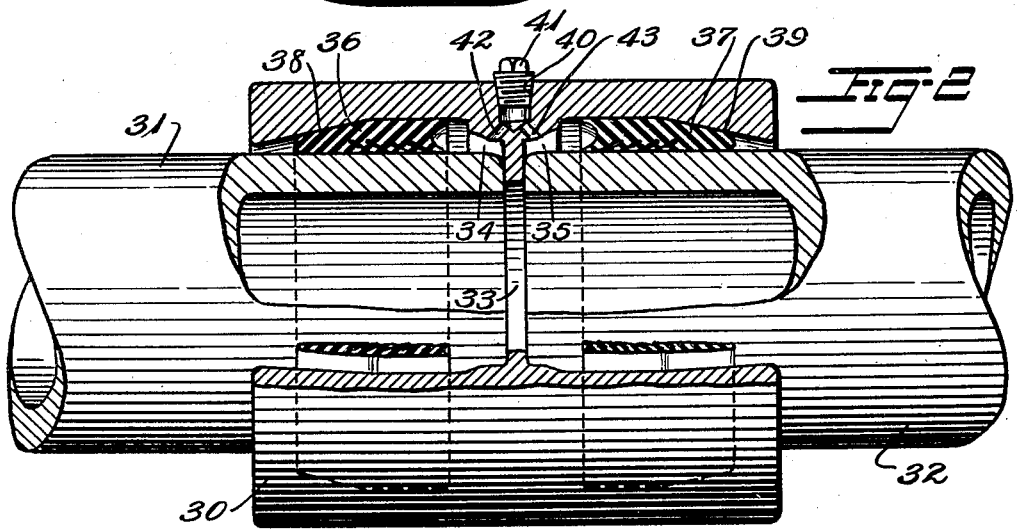
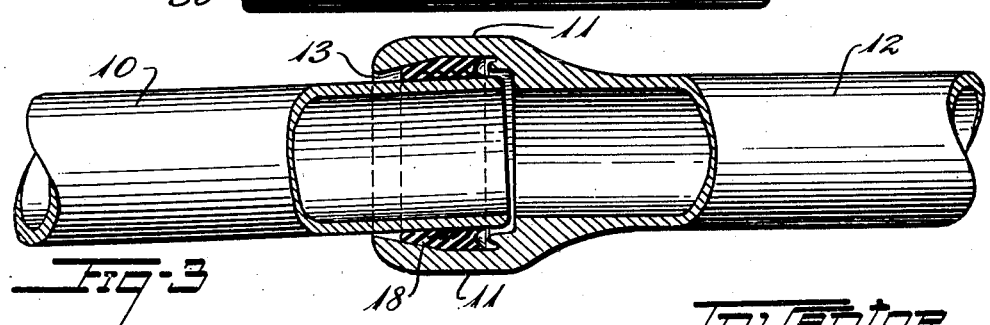
Inventor
Tracy D. Nathan
By Willis F. Avery
Atty.

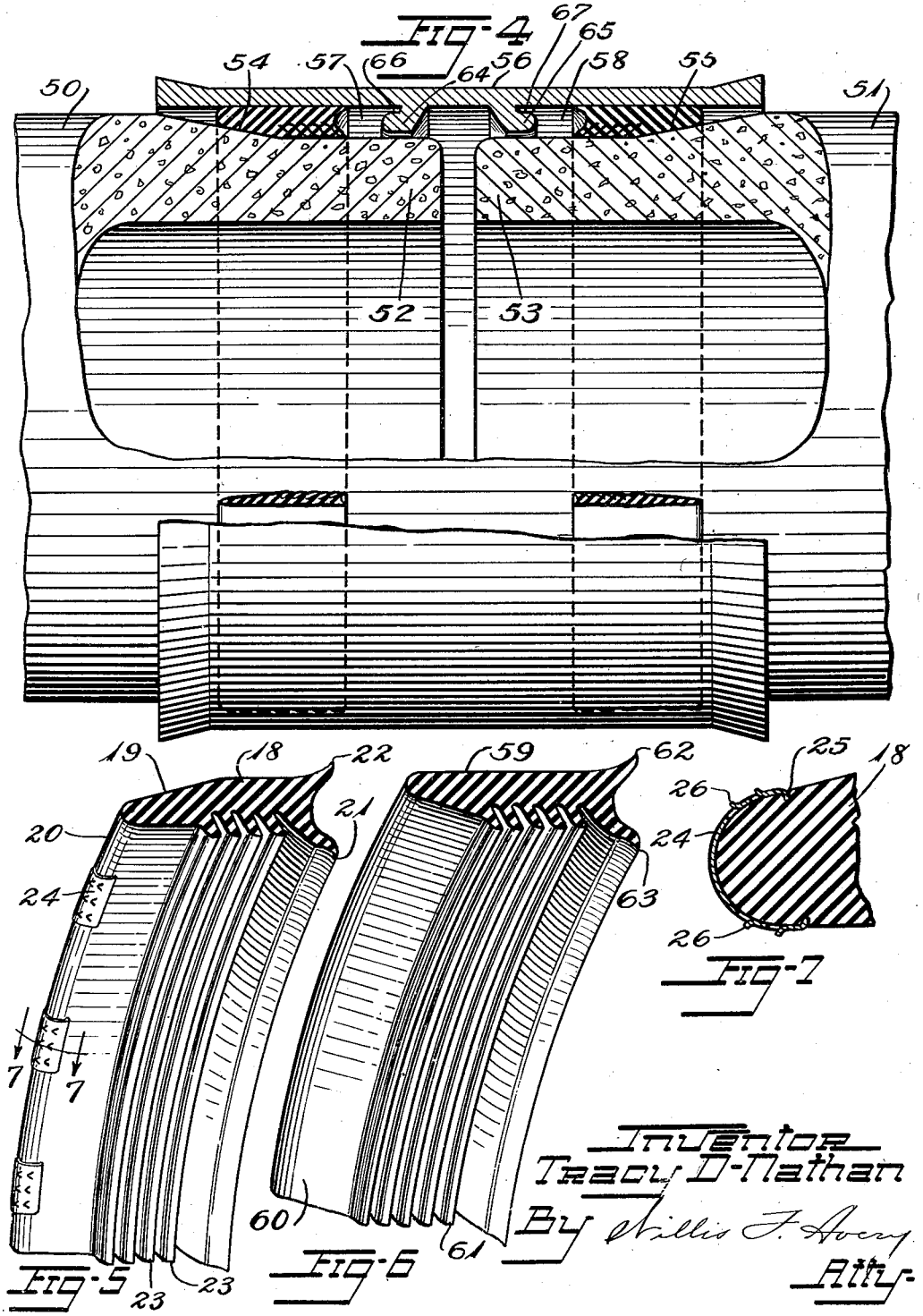

Patented July 23, 1940

2,209,235

UNITED STATES PATENT OFFICE 2,209,235

PIPE JOINT ASSEMBLY

Tracy D. Nathan, Cuyahoga Falls, Ohio, assignor to The B. F. Goodrich Company, New York, N. Y., a corporation of New York Application June 29, 1938, Serial No. 216,531

5 Claims. (Cl. 285—193)

This invention relates to pipe joint assemblies and is applicable to pipes of metal, glass, ceramic material, concrete or other composition.

The principal object of the invention is to provide a joint which will seal itself at low pressures, will remain sealed at high or low pressures, and will resist displacement under fluctuation of line pressure.

Other objects of the invention are to provide security and simplicity of sealing, to simplify assembly of the joint, to prevent retraction of the sealing member under loss of pressure in the line, to provide automatic sealing under pressure, and to provide for automatic electrical bonding of metal pipes at the joint.

These and other objects will appear from the following description and the accompanying drawings.

Of the drawings:

Fig. 1 is a side view, partly broken away and partly in section, of a pipe joint assembly embodying the invention in one of its forms.

Fig. 2 is a similar view of another form of the invention.

Fig. 3 is a view similar to Fig. 1 and showing the form of joint of Fig. 1, illustrating accommodation of the joint to flexing of the line.

Fig. 4 is a side view, partly broken away and partly in section, of another modification of the invention.

Fig. 5 is a perspective view of a section of one form of sealing element.

Fig. 6 is a similar view of another form of sealing element.

Fig. 7 is a cross-sectional view of the sealing element of Fig. 5, taken on line 7—7 thereof, showing the electrical bonding element, other parts being broken away.

Referring to the drawings, and first particularly to the form thereof illustrated in Figs. 1, 3, and 5, the numeral 10 designates the spigot end of a pipe section entered in a bell 11 of another pipe section 12. The bell 11 is reduced in diameter toward its mouth 13, being conically tapered as at 14, from the mouth to its greatest diameter at the chambered portion 15. Thereafter the bell is reduced as at 16 to provide an aligning counterbore loosely fitting about the spigot. A channel 17 is also preferably provided to accommodate the outer sealing lip of the sealing member during assembly of the joint.

The shoulder between the channel 17 and the bore of the pipe provides a solid support against which the sealing member may rest during insertion of the spigot into the bell to prevent objectionable bulging of the sealing member radially inward and wedging of the sealing member between the spigot and the bell such as would damage the sealing member. Assembly is simplified and facilitated, and the groove 17 clears the outside sealing lip and prevents its being crumpled or pinched. The end of the spigot preferably should be rounded as at 10ª so as to assist in entering the spigot and to prevent pinching of the sealing member.

Seated between the bell and the spigot is a resilient annular sealing member 18 comprising a body of resilient material, preferably of rubber or rubber-like material, tapered conically as at 19 near one margin to a round nose 20 to provide a wedge-like portion, and having, at its other margin, flared inner and outer flanges 21, 22 forming sealing lips for engaging the surface of the spigot and the bell respectively, the spread of the lips being such that when in the joint each lip will engage a pipe wall in sealing relation and seal off the chamber 15 so that the pressure within the pipe will drive the wedge-like nose of the sealing member into the conical space between the bell and the spigot. The included angle of the tapered portion of the belt and that of the tapered portion of the sealing member are relatively small, as shown in the drawings, which has the advantage that the sealing member will have less tendency to retract from the wedged position when fluid pressure in the line is relieved.

In effect, the sealing lips are of such flexibility and so disposed as to seal the joint even at very low fluid pressures thereby causing the sealing member to be driven along the chamber axially of the pipe by the fluid pressure until its wedge portion is driven tightly into the narrowed space of the bell and there seals the joint against high pressures. The sharp outer edges of the lips are preferably turned normally toward the surface of the pipe, as in Figs. 5 and 6.

To provide additionally for sealing the joint and to provide for retaining the sealing member in sealing position in the joint, even when the hydrostatic pressure is decreased within the line, a plurality of angularly disposed parallel flanges 23 are provided on one face of the sealing member, preferably on the inner face thereof. The flanges are inclined inwardly toward the thick edge of the sealing member but are spaced from the sealing lips, as shown, for non-interfering action, and are of substantial stiffness so as to engage the pipe as moving struts or ratchet pawl members tending to hold the sealing member in place and to permit its movement toward its wedge shaped margin but resisting counter movement under fluctuations of pressure in the line. As the flanges extend away from the mouth of the pipe bell, they permit entrance into the bell of the spigot end of the pipe with very little force, but, acting as ratchet pawls or moving struts, they strongly resist separation of the pipe.

As shown in Fig. 3, effective sealing is maintained despite shifting of the pipe lengths out of exact alignment. Angular shifting of a pipe length occurs about the wedged, compacted portion of the sealing member and the remaining portion of the sealing member clings resiliently to pipe so that the sealing lips maintain their effectiveness in utilizing the fluid pressure to urge the sealing member into the wedged position.

Where it is desired to provide for thawing a line of metal pipe by use of an electric current, insulation of the pipe sections from each other may be prevented, and continuity of metallic circuit provided by metallic bonding elements 24, preferably C-section, as shown, clinched on the nose of the sealing ring by inturned margins 25, as shown in Fig. 5. Contact of metal to metal is assured by sharp points 26 struck up from the metal of the bond and adapted to bite through paint or other insulating coating on the pipe when the sealing member is forced into place. The bonds may be united with the sealing member during the molding thereof if desired.

Where the sealing members are used between ceramic, concrete or other pipe of insulating material or where electric conductivity of the line is undesirable or unnecessary the bonds 24 are unnecessary and the sealing element may be made without them as shown in Fig. 6.

Where it is desired to use plain pipe without flanges, screw threads, bells, or other connecting means integral with the pipe, this may be done as illustrated in Fig. 2 by the use of a sleeve 30 adapted to engage over the pipe ends 31, 32. The sleeve is preferably formed with an internal annular partition flange 33 adapted to extend between the ends of the pipe enough to hold the collar in proper position without interfering with flow through the pipe. The sleeve is formed with chambers 34, 35 at each side of the partition flange to receive the sealing members 36, 37 of the type just described. The mouths of the sleeve are tapered inwardly as at 38, 39 to provide conical sealing surfaces defining tapered spaces to receive the sealing members.

To provide for locally seating the sealing members without building up pressure in the entire line, the sleeve 30 may be drilled and tapped at its center as at 40 to removably receive a screw plug 41. Communication is provided to the chambers 34, 35 from the plugged opening 40 by passages 42, 43. By removing the plug 41 and connecting an air line or other source of pressure to the opening 40, the sealing elements may be driven into place without loading the line although leakage into the line simultaneously occurs.

In the form of the invention illustrated in Figs. 4 and 6, which is convenient especially when the pipe is of concrete or other non-metallic composition, the pipes 50, 51 are reduced near their ends to form a spigot 52, 53 of reduced diameter which is joined to the body of the pipe by a conical portion 54, 55. A metal sleeve 56 extends over the reduced ends and is only slightly larger in diameter than the body of the pipe but is sufficiently larger than the reduced ends of the pipe to provide a chamber 57, 58 therebetween to receive the sealing member. The sealing member is generally cylindrically as at 59 on its outer face and is conical as at 60 on its inner face near one margin to provide an inclined wedging surface to engage the inclined surface of the pipe. The inner face of the sealing element is formed with inclined spaced annular flanges 61 similar to those on the sealing element of Fig. 5 previously described, for assisting in sealing the joint and to act as moving struts or ratchet pawls to retain the sealing member in place. If desired the pipe may be cylindrical and the sleeve tapered as in Fig. 2, in which case the sealing member should be conical on its outer face.

At the margin opposite to the tapered portion, the sealing member is formed with an outwardly turned lip-sealing flange 62 and an inwardly turned lip-sealing flange 63 each adapted to engage a wall of the chamber in sealing engagement therewith, the flange 62 being larger in diameter than the inside of the sleeve 56 and the flange 63 being smaller in diameter at its edge than the reduced portion of the pipe so as initially to contact therewith. The sleeve 56 is formed with inwardly extending shoulders 64, 65 to separate the sealing members and to act as abutments to support the sealing members against injury and to maintain their proper positions during insertion of the spigot into the bell and these flanges may be undercut as at 66, 67 to provide clearance for the sealing member and to prevent injury to its outer sealing flange when entering the pipe in the sleeve, as well as to resist bulging of the sealing member radially inward.

In assembling the joint, the sealing members may be assembled within the sleeve, and the pipes then entered therein endwise, after which by introduction of pressure fluid into the line, the sealing members are driven into the wedged part of the sealing chambers and the inclined flanges retain them in position while the sealing lips prevent passage of fluid.

This form of the invention is especially useful when space is at a premium as the sleeves are not much larger than the pipe itself.

In each of the forms of the invention the wedging action of the sealing members in the chambers provides sealing and also acts to prevent blow-out of the sealing members. Due to the sealing lips fluid can never get around the sealing element. Sealing is effective at all pressures, high and low, and this construction has the advantage that the pressure of the conducted fluid itself is effectively utilized to maintain sealing pressure without the necessity of applying external clamping devices. Any fluctuations in fluid pressure tending to displace the sealing members are resisted by the inclined flanges 23 or 61 engaging the pipes as ratchet pawls or as moving struts.

Many modifications may be made without departing from the invention as it is defined by the following claims.

I claim:

1. A pipe joint assembly comprising a pair of telescoped pipe members the walls of which define an axially tapered annular space therebetween and one of which is provided with a shoulder having an undercut portion, and a single annular sealing member of resilient material in said space, said sealing member comprising at one margin a pair of annular, oppositely disposed sealing lips to bear against the walls of the space, and at the other margin a wedge-shaped portion adapted to be urged into the tapered space by fluid pressure against the first said margin, said undercut portion being adapted to receive one of the sealing lips during telescopic assembly of the pipe members and sealing member.

2. A pressure fluid sealing gasket for an annular tapered joint space between inner and outer pipe members to seal the tapered space by a wedging of the gasket therein under the force of fluid pressure behind the gasket, said gasket being in one piece of resilient rubber-like material and having inner and outer lips at its rear end adapted to engage the inner and outer walls, respectively, of said space, the inner lip projecting rearward and radially inward and the outer lip projecting rearward and radially outward of the body of the gasket, and both lips tapering to edges adapted to remain against the walls of said space to bar the pressure fluid and utilize the same to urge the gasket forwardly to wedge in said space, and a projecting portion at a peripheral face of the gasket, axially spaced from said lips for non-interfering action, adapted to engage the adjacent wall of the space to resist rearward movement of the gasket in said space from its forward, wedged position.

3. A pressure fluid sealing gasket for an annular tapered joint space between inner and outer pipe members to seal the tapered space by a wedging of the gasket therein under the force of fluid pressure behind the gasket, said gasket being in one piece of resilient rubber-like material and having inner and outer lips at its rear end adapted to engage the inner and outer walls, respectively, of said space, the inner lip projecting rearward and radially inward and the outer lip projecting rearward and radially outward of the body of the gasket, and both lips tapering to edges adapted to remain against the walls of said space to bar the pressure fluid and utilize the same to urge the gasket forwardly to wedge in said space, and a resilient rib projecting from a side of the body of the gasket adapted upon forward movement of the gasket in said space to be deflected in contact with the adjacent wall of the space to resist rearward movement of the gasket in said space.

4. A pressure fluid sealing gasket for an annular tapered joint space between inner and outer pipe members to seal the tapered space by a wedging of the gasket therein under the force of fluid pressure behind the gasket, said gasket being in one piece of resilient rubber-like material and having inner and outer lips at its rear end adapted to engage the inner and outer walls, respectively, of said space, the inner lip projecting rearward and radially inward and the outer lip projecting rearward and radially outward of the body of the gasket, and both lips tapering to edges adapted to remain against the walls of said space to bar the pressure fluid and utilize the same to urge the gasket forwardly to wedge in said space, and a plurality of resilient ribs projecting from a side of the body of the gasket adapted upon forward movement of the gasket in said space to be deflected rearwardly in contact with the adjacent wall of the space to resist rearward movement of the gasket in said space.

5. A pressure fluid sealing gasket for an annular tapered joint space between inner and outer pipe members to seal the tapered space by a wedging of the gasket therein under the force of fluid pressure behind the gasket, being in one piece of resilient rubber-like material and having inner and outer lips at its rear end adapted to engage the inner and outer walls, respectively, of said space, the inner lip projecting rearward and radially inward and the outer lip projecting rearward and radially outward of the body of the gasket, and both lips tapering to edges adapted to remain against the walls of said space to bar the pressure fluid and utilize the same to urge the gasket forwardly to wedge in said space, a projecting portion at a peripheral face of the gasket, axially spaced from said lips for non-interfering action, adapted to engage the adjacent wall of the space to resist rearward movement of the gasket in said space from its forward, wedged position, and metallic means of generally C-section enclosing the forward end of said gasket for engagement with the walls of said space to provide an electrically conductive path therebetween.

TRACY D. NATHAN.